(12) United States Patent
Cakulev et al.

(10) Patent No.: US 10,609,667 B1
(45) Date of Patent: Mar. 31, 2020

(54) SYSTEM AND METHOD FOR DELIVERY OF END DEVICE POLICIES DURING REGISTRATION PROCEDURE

(71) Applicant: Verizon Patent and Licensing Inc., Arlington, VA (US)

(72) Inventors: Violeta Cakulev, Millburn, NJ (US); Sudhakar Reddy Patil, Flower Mound, TX (US); Deepa Jagannatha, Bridgewater, NJ (US); Lalit R. Kotecha, San Ramon, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/259,080

(22) Filed: Jan. 28, 2019

(51) Int. Cl.
| | |
|---|---|
| *H04W 60/00* | (2009.01) |
| *H04L 12/24* | (2006.01) |
| *H04W 48/16* | (2009.01) |
| *H04B 7/0417* | (2017.01) |
| *H04B 7/0426* | (2017.01) |
| *H04B 7/0413* | (2017.01) |
| *H04W 60/06* | (2009.01) |
| *H04B 7/06* | (2006.01) |
| *H04B 7/0452* | (2017.01) |

(52) U.S. Cl.
CPC .......... *H04W 60/00* (2013.01); *H04B 7/043* (2013.01); *H04B 7/0413* (2013.01); *H04B 7/0417* (2013.01); *H04L 41/0893* (2013.01); *H04W 48/16* (2013.01); *H04W 60/06* (2013.01); *H04B 7/0452* (2013.01); *H04B 7/0617* (2013.01); *Y02D 70/12* (2018.01); *Y02D 70/126* (2018.01)

(58) Field of Classification Search
CPC . H04L 63/20; H04L 41/0893; H04L 65/1073; H04W 60/00; H04W 48/18; H04W 60/06; H04W 84/12; H04W 48/16; H04W 84/042; H04B 7/00; H04B 7/0413; H04B 7/0417; H04B 7/043; H04B 7/0452; H04B 7/0617; Y02D 70/12; Y02D 70/126
USPC .......... 455/435.1, 432.1, 404.2, 435.2, 550.1
See application file for complete search history.

(56) References Cited

U.S. PATENT DOCUMENTS

| | | | | |
|---|---|---|---|---|
| 2016/0021582 | A1* | 1/2016 | Yu ........................ | H04W 48/18 455/436 |
| 2016/0150495 | A1* | 5/2016 | Machida ............... | H04W 60/00 455/435.3 |
| 2017/0318463 | A1* | 11/2017 | Lee ....................... | H04W 12/10 |
| 2018/0293397 | A1* | 10/2018 | DeMember ......... | G06F 21/6218 |
| 2019/0029065 | A1* | 1/2019 | Park ..................... | H04W 60/06 |
| 2019/0149531 | A1* | 5/2019 | Kakumani ............ | H04L 63/08 726/1 |
| 2019/0200266 | A1* | 6/2019 | Jun ..................... | H04W 36/125 |
| 2019/0230556 | A1* | 7/2019 | Lee ....................... | H04W 16/02 |
| 2019/0281649 | A1* | 9/2019 | Moisanen ............. | H04W 76/27 |

\* cited by examiner

*Primary Examiner* — Fred A Casca

(57) ABSTRACT

A method, a device, and a non-transitory storage medium are described in which policy delivery is provided. A network device of a core network may receive a registration request message that includes a request for an end device policy. The network device may perform a registration procedure and a policy procedure pertaining to an end device. The network device determines when the registration and the policy procedures are completed. The network device transmits a registration response that includes an end device policy to an end device.

20 Claims, 9 Drawing Sheets

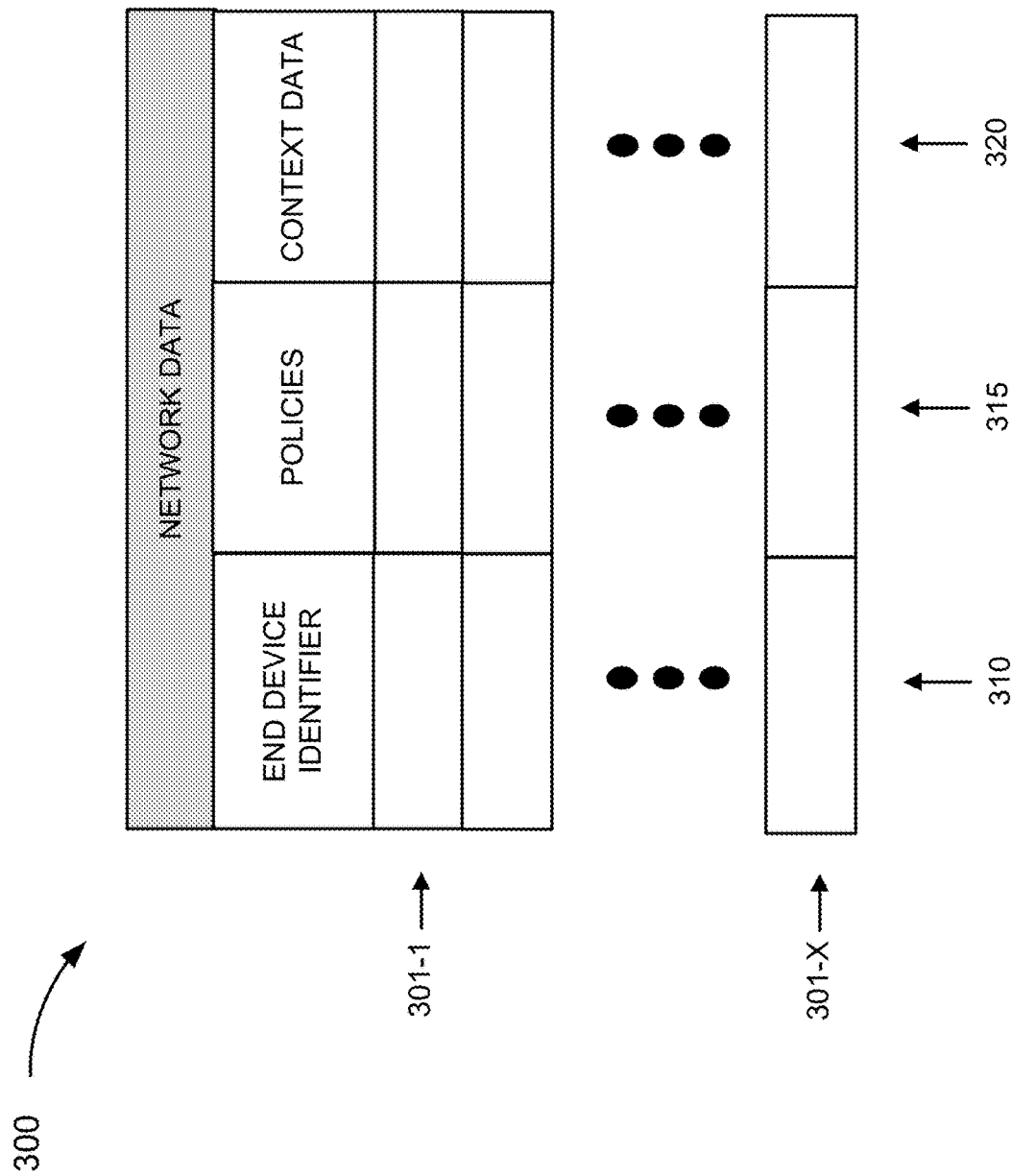

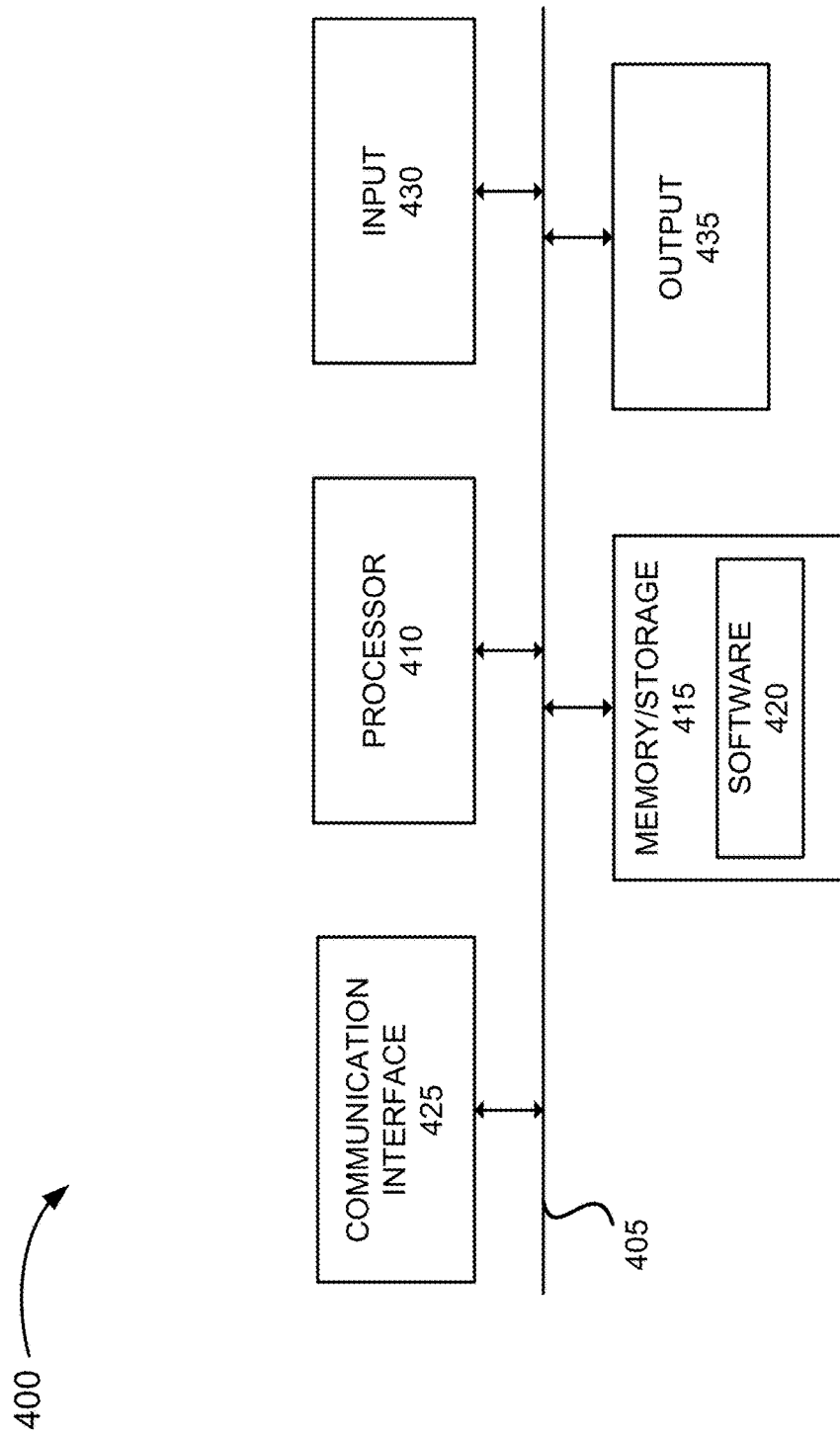

SYSTEM AND METHOD FOR DELIVERY OF END DEVICE POLICIES DURING REGISTRATION PROCEDURE

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources. Accordingly, a need exists to overcome these challenges.

BRIEF DESCRIPTION OF THE DRAWINGS

FIG. 3 is a diagram illustrating an exemplary embodiment of exemplary network data of the policy delivery service;

FIG. 4 is a diagram illustrating exemplary components of a device that may correspond to one or more of the devices illustrated and described herein.

DETAILED DESCRIPTION OF PREFERRED EMBODIMENTS

Figure 1:
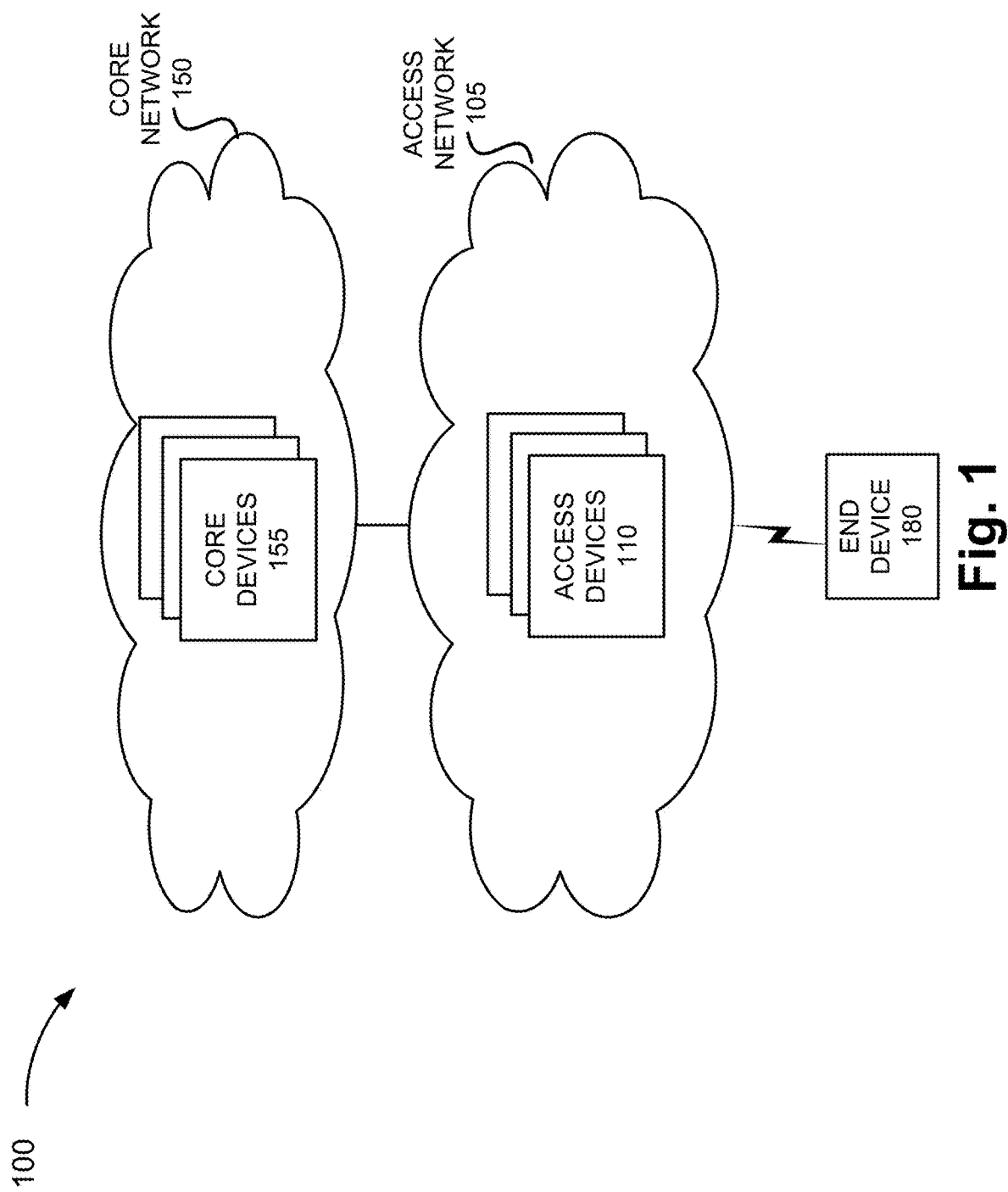
FIG. 1 is a diagram illustrating an exemplary environment in which an exemplary embodiment of a policy delivery service may be implemented.

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and provide optimal use of network resources (e.g., over-the-air, physical, logical, virtual). Additionally, an end device may support various use cases and provide optimal use of end device-side resources.

For an end device to acquire wireless service of a network, the end device has to establish a wireless connection (e.g., a Radio Resource Control (RRC) connection) with a radio access network (RAN), and may authenticate, register, and establish a bearer with a core network. Typically, as part of an attachment procedure with the core network, the end device receives policies from the core network. For example, the policies may include a policy pertaining to route selection for outgoing traffic, and a policy pertaining to network discovery and selection.

Unfortunately, depending on how the messaging between the network and the end device is coordinated, the delivery of the policies can result in unnecessary use of network and end device resources. For example, if the policies are sent to the end device before the end device has completed registration, the early delivery of the policies may result in extra messaging between the network and the end device. Alternatively, for example, if the delivery of the policies is suspended until registration is completed, a network device may need to cache the policies until the registration is completed, and include logic that identifies when the registration is completed and that the policies are for this end device before forwarding the policies to the end device. As an example, in the context of a Fifth Generation (5G) core network, an access and management function (AMF) may receive the policies of the end device from a policy control function (PCF) before a registration procedure is completed. The AMF would have to cache the policies. However, current approaches are such that the AMF is not aware of the policies (e.g., the policies are transparently forwarded by the AMF to the end device), and does not store the policies, which results in further complications.

Additionally, for example, if the policies are sent by the network or received by the end device subsequent to an initiation of a packet data unit (PDU) session by the end device (e.g., after completion of the registration), such a circumstance can lead to a race condition. As a result, the network and the end device may use extra resources to correct the condition and minimize any cascading reactions.

According to exemplary embodiments, a policy delivery service is described. According to an exemplary embodiment, an AMF may include logic that provides the policy delivery service. According to another exemplary embodiment, another type of network device of a core network (e.g., a mobility management entity) may include logic that provides the policy delivery service.

According to an exemplary embodiment, the policy delivery service includes receiving from an end device, a message that includes a registration request and a policy request. According to an exemplary embodiment, in response to receiving the message, the network device invokes a registration procedure and a policy procedure.

According to an exemplary embodiment, the network device determines whether the registration procedure and the policy procedure are completed. When the network device determines that the registration procedure and the policy procedure are not completed, the network device may wait for their completion. When the network device determines that the registration procedure and the policy procedure are completed, the network device may generate a message that includes a policy response and a registration response. According to an exemplary embodiment, the network device of the core network may generate and transmit the policies in a registration message (e.g., a registration response or a registration accept) to the end device.

According to an exemplary embodiment, the message may be transmitted on a control plane or a signaling plane used by the network and the end device. For example, the message may be transmitted via a downlink non-access stratum (NAS) plane.

According to an exemplary embodiment, the policies include a policy that indicates route selection for the end device (also referred to herein as a route selection policy (RSP)). For example, the end device may use the policy to select a route for outgoing traffic relating to an establishment of a PDU session, an offload, and/or an already established PDU session. According to an exemplary embodiment, the policies include a policy that indicates access network discovery and selection for the end device (also referred to herein as an access network discovery and selection policy (ANDSP)). For example, the end device may use the policy to select from various types of access networks (e.g., home, visitor, a network of a particular standard (e.g., a Third Generation Partnership Project (3GPP) network, a non-3GPP network, etc.), and/or other type of network defined by some criterion).

As a result, the policy delivery service may improve network resource utilization in a network. For example, the policy delivery service may improve the use of various network resources (e.g., physical, logical, virtual) in relation to network devices of an access network or network devices of the access network and a core network based on the reduction of messages being transmitted and received regarding the delivery of the policies to the end device, and/or avoidance of a race condition. Additionally, the policy delivery service may improve resource utilization at the end device for similar reasons.

FIG. 1 is a diagram illustrating an exemplary environment 100 in which an exemplary embodiment of the policy delivery service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to access devices 110 and/or core network 150.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and so forth. Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Core network 150 may include one or multiple networks of one or multiple types and technologies. According to an exemplary embodiment, core network 150 includes a complementary network of access network 105. For example, core network 150 may be implemented to include an EPC of an LTE, a core network of an LTE-Advanced (LTE-A) network, a core network of an LTE-A Pro network, and/or a next generation core (NGC) network. Core network 150 may include a legacy core network.

Depending on the implementation, core network 150 may include various types of network devices, such as core devices 155. According to an exemplary embodiment, one or multiple core devices 155 include logic that provides the policy delivery service, as described herein. For example, core devices 155 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core devices 155 may include additional, different, and/or fewer network devices than those described.

End device 180 includes a device that has computational and wireless communication capabilities. Depending on the implementation, end device 180 may be a mobile device, a portable device, or a stationary device. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, etc.). Additionally, end device 180 may include one or multiple communication interfaces that provide one or multiple (e.g., simultaneous) connections via the same or different RATs, frequency bands, and so forth. The multimode capabilities of end device 180 may vary among end devices 180.

FIGS. 2A-2E are diagrams illustrating an exemplary process of an exemplary embodiment of the policy delivery service. As illustrated, an environment 200, which is consistent with environment 100, access network 105 includes a gNB 210, and core network 150 includes an AMF 255, a PCF 260, and a UDM 265.

Figure 2A:
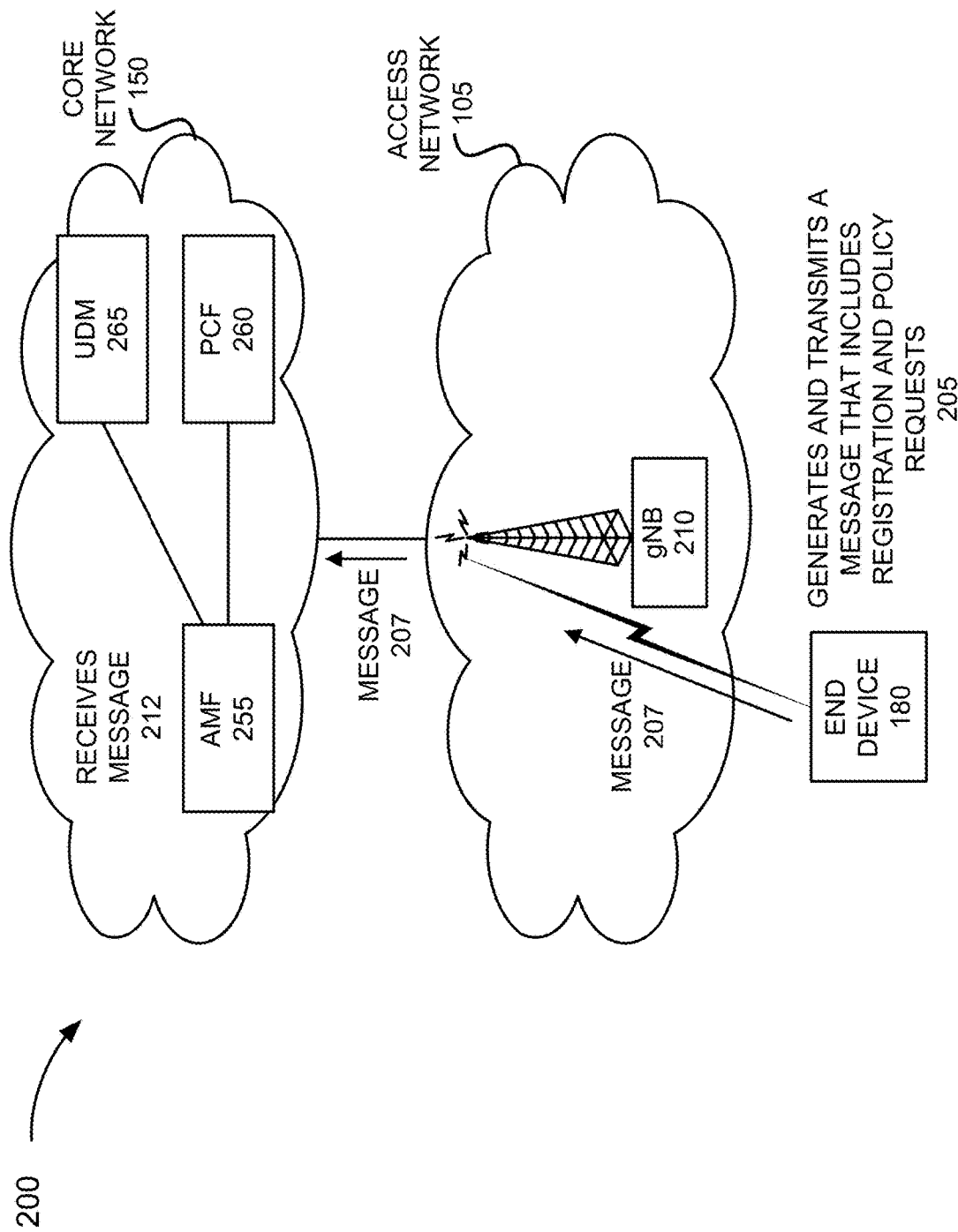
FIGS. 2A-2E are diagrams illustrating an exemplary process of an exemplary embodiment of the policy delivery service.

Referring to FIG. 2A, end device 180 generates and transmits a message that includes registration and policy requests 205. For example, a message 207 may be transmitted via gNB 210 to AMF 255 subsequent to completion of an RRC procedure with gNB 210. Message 207 may include a Registration Request message and a UE Policy Section Identifier (UPSI) List Transport message. The Registration Request message may indicate a request for end device 180 to register with core network 150 and/or AMF 255. As illustrated, AMF 255 may receive the message 212.

Figure 2B:
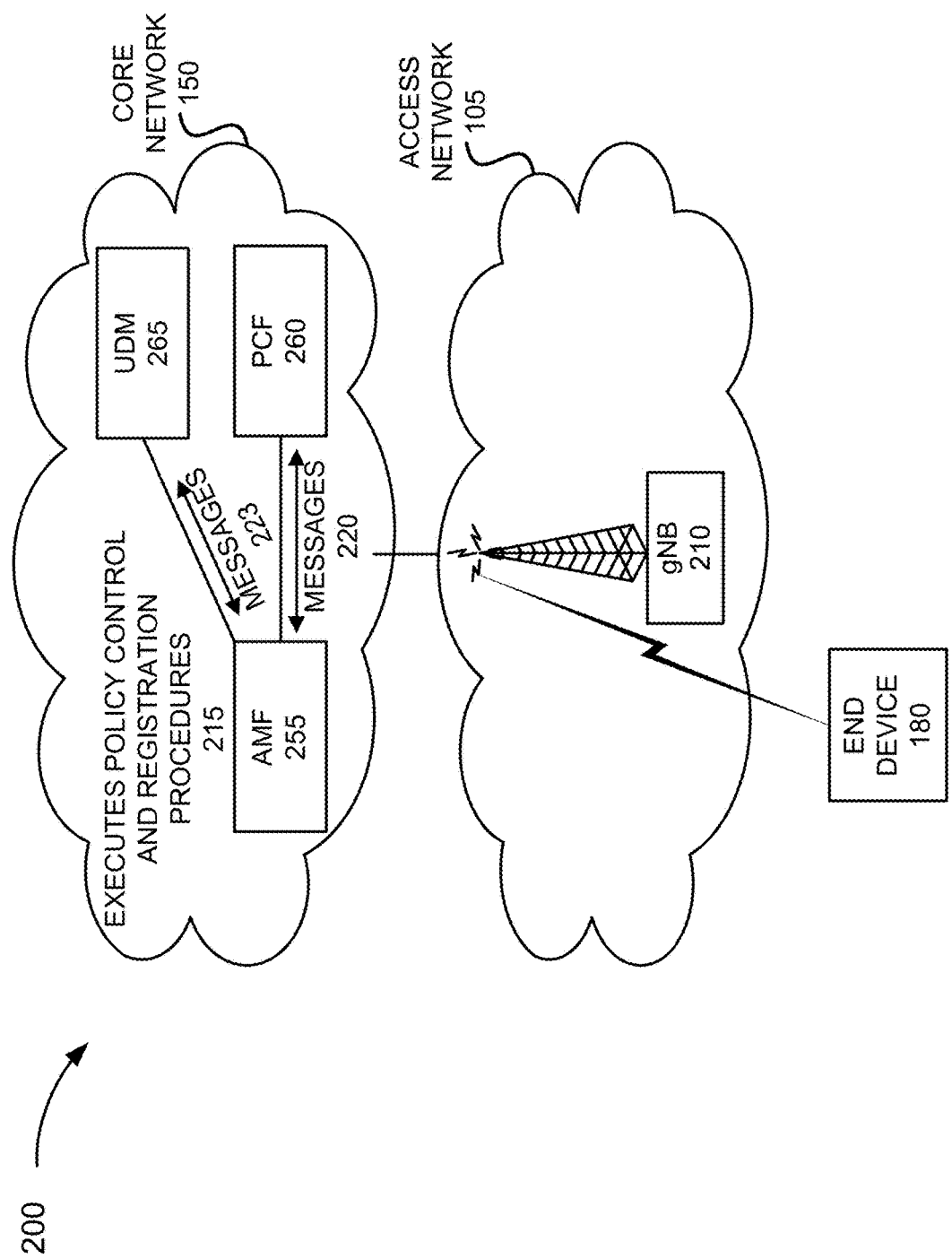

Referring to FIG. 2B, in response to receiving and reading the message, AMF 255 may execute policy control and registration procedures 215. For example, the policy control procedure may include messages 220 communicated between AMF 255 and PCF 260.

According to an exemplary implementation, messages 220 may include a policy control create request message from AMF 255 to PCF 260. The policy control create request message may include data requesting the creation of a policy association. Additionally, for example, messages 220 may include a policy control create response message from PCF 260 to AMF 255. The policy control create response message may include policy association information and end device policies pertaining to end device 180.

According to an exemplary embodiment, the end device policies may include an ANDSP. According to another exemplary embodiment, the end device policies may include an RSP. According to still other exemplary embodiments, the end device policies may include another type of policy that governs how end device 180 selects or accesses a network, a route, and/or another aspect of the wireless service pertaining end device 180.

According to other exemplary implementations, messages 220 may include additional and/or different messages. For example, messages 220 may include subscribe request/response messages pertaining to a registration of PCF 260 for events (e.g., location report, registration state report, or other context data).

Additionally, for example, the registration procedure may include messages 223 communicated between AMF 255 and UDM 265. According to an exemplary implementation, messages 223 may include a registration request message from AMF 255 to UDM 265. The registration request message may include data requesting a registration of AMF 255 with UDM 265. Additionally, for example, messages 223 may include a registration response message from UDM 265 to AMF 255. The registration response message may include data indicating a successful registration.

According to other exemplary implementations, messages 223 may include additional and/or different messages. For example, messages 223 may includes message pertaining to retrieval of access and mobility subscription data, SMF selection subscription data, and/or UE context data.

Figure 2C:
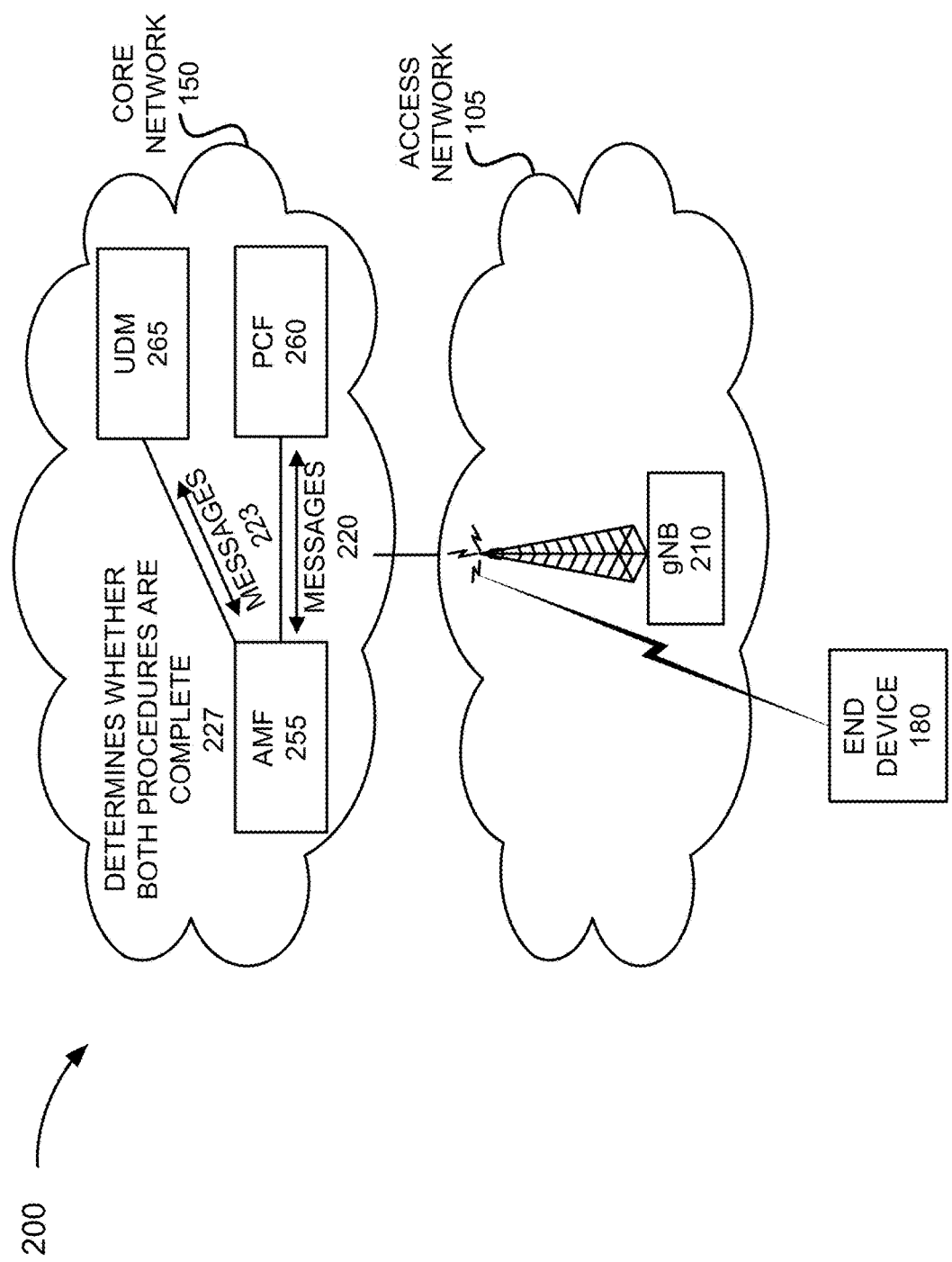

Referring to FIG. 2C, subsequent to the invocation of the policy control and registration procedures, AMF 255 may determine whether both procedures are completed 227. For example, AMF 255 may determine whether a procedure is completed or not based on a receipt of a message from UDM 265 or PCF 260, and/or the occurrence of some other event (e.g., reading or verifying the obtainment of data (e.g., successful registration, end device policies received, etc.) pertaining to the procedure).

Figure 2D:
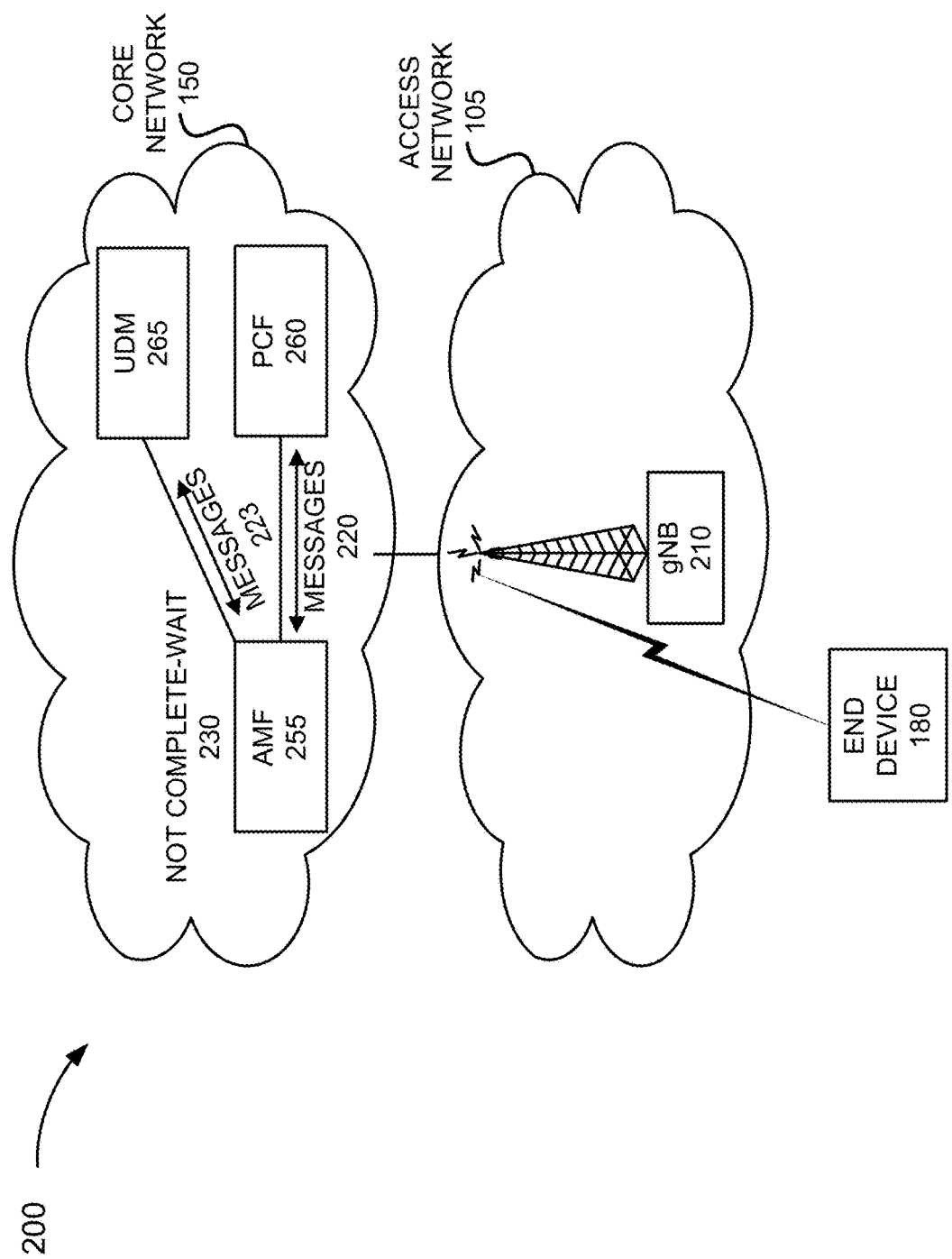

Referring to FIG. 2D, when AMF 255 determines that both procedures are not completed, AMF 255 may wait 230. For example, AMF 255 may wait until it is determined that both procedures are completed. According to an exemplary embodiment, AMF 255 may store the end device policies in response to receiving the end device policies. AMF 255 may include logic that identifies the presence of the end device policies in a message associated with the policy control procedure. An example of network data that includes the end device policies is described below.

FIG. 3 is a diagram illustrating exemplary network data that may be stored in a table 300. As illustrated, table 300 may include an end device identifier field 310, a policies field 315, and a context data field 320. As further illustrated, table 300 includes entries 301-1 through 301-X (also referred as entries 301, or individually or generally as entry 301) that each includes a grouping of fields 310, 315, and 320 that are correlated (e.g., a record, etc.). Network data is illustrated in tabular form merely for the sake of description. In this regard, network data may be implemented in a data structure different from a table (e.g., a list, a flat file, etc.). The values illustrated in entry 301-1 are exemplary.

End device identifier field 310 may store data that (uniquely) identifies an end device (e.g., end device 180). For example, the end device identifier may be implemented to include globally unique temporary identifier (GUTI), a permanent equipment identifier (PEI), a subscription permanent identifier (SUPI), and/or another type of identifier that identifies end device 180.

Policies field 315 may store end device policies. For example, the end device policies may be implemented to include an RSP, an ANDSP, and/or another type of policy that may govern the wireless service of end device 180.

Context data field 320 may store other types of data pertaining to end device 180 and/or wireless service. For example, context data field 320 may store access and mobility subscription data, SMF selection subscription data, UE context data, and/or other types of data.

According to other exemplary implementations, table 300 may store additional, fewer, and/or different instances of network data in support of the policy delivery service, as described herein.

Figure 2E:
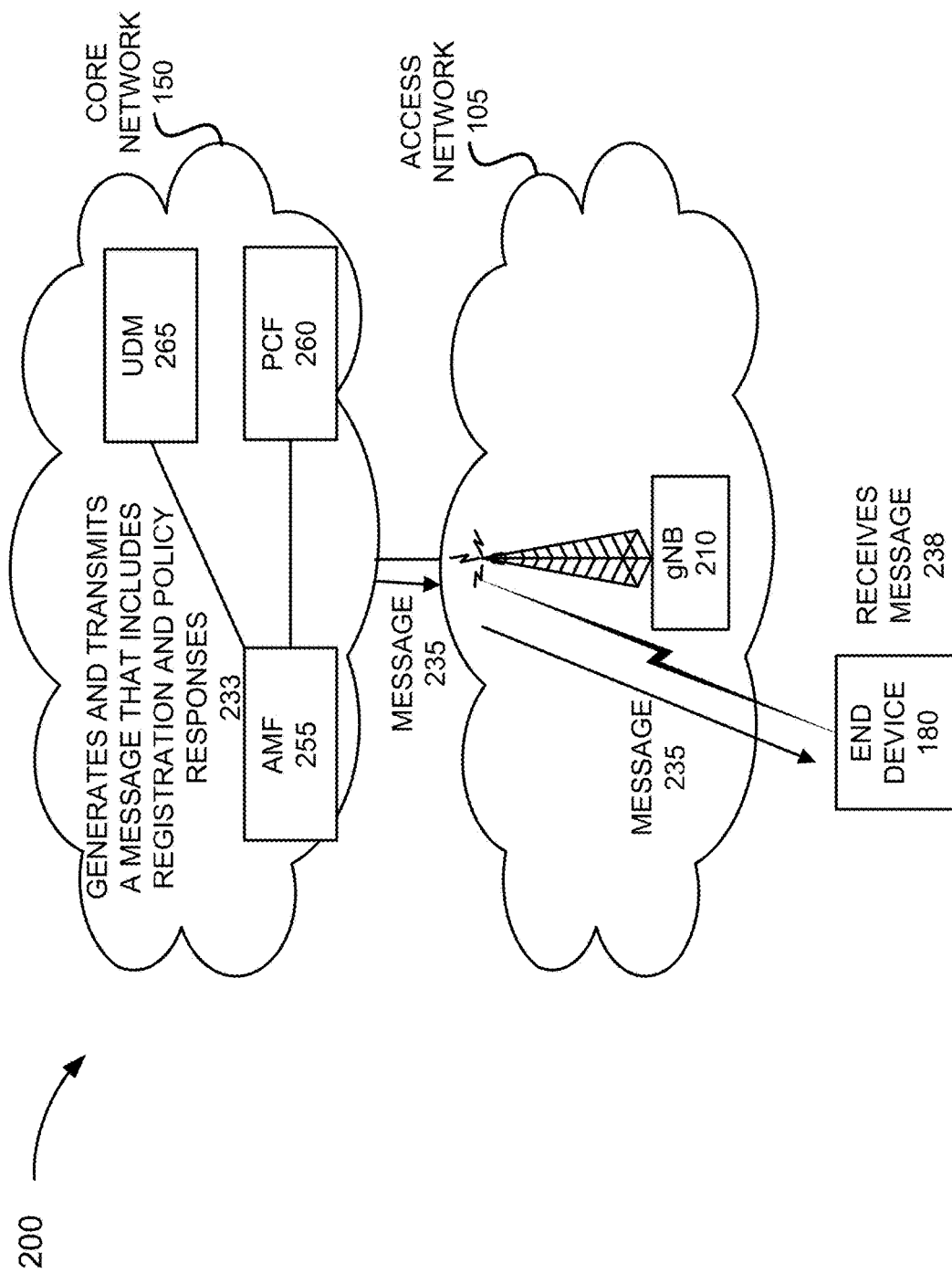

Referring to FIG. 2E, when AMF 255 determines that both procedures are completed, AMF 255 may generate and transmit a message that includes registration and policy responses 233. For example, a message 235 may be transmitted via gNB 210 to end device 180. Message 235 may include a Registration Accept message and the end device policies. By way of further example, the Registration Accept message may include a UE Policy Section Management information element (IE). The UE Policy Section Management IE includes the end device policies. Message 235 may be transmitted as a NAS message. End device 180 may receive the message 238. End device 180 may use the end device policies while connected to the network.

Although FIGS. 2A-2E illustrate an exemplary process of the policy delivery service, according to other exemplary embodiments, the process may include additional, different, and/or fewer steps, and/or include additional, different, and/or fewer messages. For example, according to other exemplary embodiments, AMF 255 may not store the end device policies. Additionally, or alternatively, AMF 255 may store the end device policies only when the registration procedure is not completed and the policy control procedure is completed.

FIG. 4 is a diagram illustrating exemplary components of a device 400 that may be included in one or more of the devices described herein. For example, device 400 may correspond to components included in access devices 110, core devices 155, end device 180, gNB 210, AMF 255, UDM 265, and PCF 260. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., a cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect AMF 255 (or an MME), software 420 may include an application that, when executed by processor 410, provides a function of the policy delivery service, as described herein. Additionally, with reference to end device 180 or another network device, software 420 may include an application that, when executed by processor 410, provides a function of the policy delivery service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
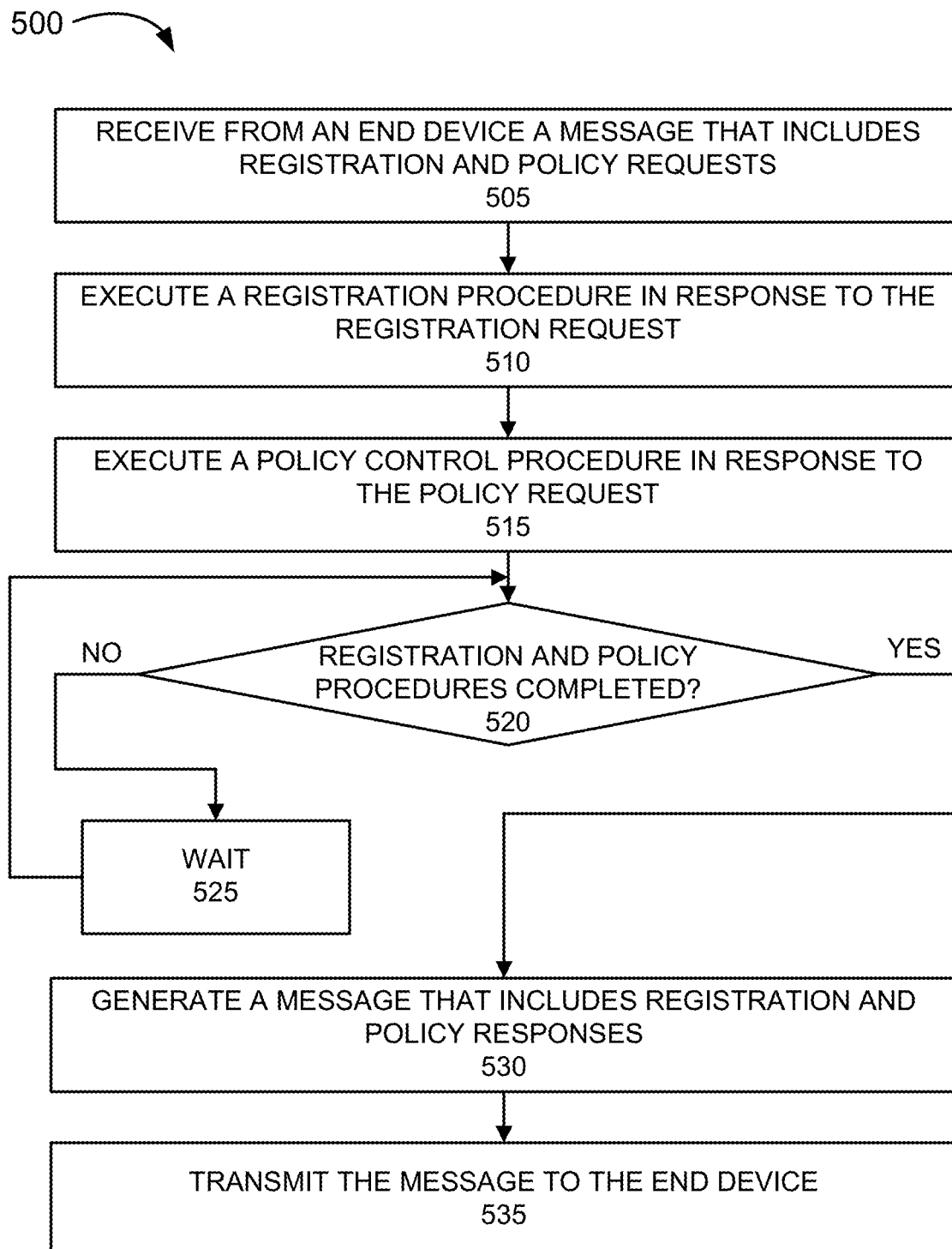
FIG. 5 is a flow diagram illustrating an exemplary process of an exemplary embodiment of the policy delivery service.

FIG. 5 is a flow diagram illustrating an exemplary process 500 of an exemplary embodiment of the policy delivery service. According to an exemplary embodiment, a network device of a core network (e.g., core device 155) performs steps of process 500. According to various exemplary embodiments, the network device may be an AMF or an MME. For example, processor 410 executes software 420 to perform a step illustrated in FIG. 5 and described herein. Additionally, or alternatively, a step illustrated in FIG. 5 may be performed by execution of only hardware.

In block 505, a message that includes a registration request and a policy request may be received from an end device. For example, the network device may receive a registration request that includes a UPSI list.

In block 510, a registration procedure may be executed in response to receiving the registration request. For example, the network device may invoke and execute a registration procedure with a UDM, an HSS, or a similarly functioning network device (e.g., a Home Location Register (HLR), a subscriber profile repository (SPR), etc.) in response to receiving the registration request.

In block 515, a policy control procedure may be executed in response to receiving the policy request. For example, the network device may invoke and execute a policy control procedure with a PCF, a PCRF, or a similarly functioning network device (e.g., a policy server, etc.) in response to receiving the UPSI list.

In block 520, it may be determined whether the registration and policy control procedures are completed. For example, the network device may determine whether the registration and policy control procedures are completed based on the receipt of a message or the obtainment of data during the execution of the procedure.

When it is determined that the registration and policy control procedures are not completed (block 520—NO), the network device may wait (block 525). For example, the network device may continue to execute a procedure that has not been completed.

When it is determined that the registration and policy control procedures are both completed (block 520—YES), the network device may generate a message that includes registration and policy response (block 530). For example, the network device may generate a registration response that includes end device policies for end device 180 resulting from the completion of the policy control procedure. By way of further example, the network device may generate a registration accept message that includes an IE that includes one or multiple types of policies (e.g., an RSP, an ANDSP, and/or another type of policy that may govern the wireless service of end device 180).

In block 535, the message may be transmitted. For example, the network device may transmit the message, which includes the registration and policy response, to end device 180. The message may be transmitted as a NAS message or via another plane of communication.

Although FIG. 5 illustrates an exemplary process 500 of the policy delivery service, according to other embodiments, process 500 may include additional operations, fewer operations, and/or different operations than those illustrated in FIG. 5, and described herein. For example, the network device may store the end device policies pertaining to end device 180, as previously described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to a process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device of a core network from an end device, a first message that includes an initial registration request and an end device policy request that includes a User Equipment (UE) Policy Section Identifier (UPSI) List Transport message, and wherein the end device is not registered with the network device;
   executing, by the network device in response to receiving the first message, a registration procedure and a policy control procedure;
   determining, by the network device, whether the registration procedure and the policy control procedure are completed;
   generating, by the network device, when the registration procedure and the policy control procedure are completed, a second message that includes a registration response and an end device policy, wherein the first message is received as a non-access stratum message and the second message is transmitted as another non-access stratum message; and
   transmitting, by the network device to the end device, the second message.

2. The method of claim 1, wherein the second message includes a registration accept message that includes an information element, wherein the information element includes the end device policy.

3. The method of claim 1, further comprising:
   storing, by the network device, the end device policy only when the registration procedure is not completed and the policy control procedure is completed.

4. The method of claim 1, further comprising:
   transmitting, by the network device, a registration request to a unified data management device.

5. The method of claim 1, wherein determining whether the registration procedure and the policy control procedure are completed further comprises:
   determining, by the network device, whether a registration response is received from a unified data management device or a home subscriber server; and
   determining, by the network device in response to determining that the registration response is received, that the registration procedure is completed.

6. The method of claim 1, wherein determining whether the registration procedure and the policy control procedure are completed further comprises:
   determining, by the network device, whether a policy control create response is received from a policy control function device or a policy charging and rules function; and
   determining, by the network device in response to determining that the policy control create response is received, that the policy control procedure is completed.

7. The method of claim 1, wherein the end device policy includes at least one of a route selection policy or an access discovery and selection policy.

8. The method of claim 1, wherein the network device is a mobility management entity device or an access and management function device, and the core network includes an evolved packet core network or a next generation core network.

9. A network device comprising:
   a communication interface;
   a memory, wherein the memory stores instructions; and
   a processor, wherein the processor executes the instructions to:
   receive, via the communication interface from an end device, a first message that includes an initial registration request and an end device policy request that includes a User Equipment (UE) Policy Section Identifier (UPSI) List Transport message, wherein the network device is of a core network, and wherein the end device is not registered with the network device;
   execute, in response to the receipt of the first message, a registration procedure and a policy control procedure;
   determine whether the registration procedure and the policy control procedure are completed;
   generate, when the registration procedure and the policy control procedure are completed, a second message that includes a registration response and an end device policy, wherein the first message is received as a non-access stratum message and the second message is transmitted as another non-access stratum message; and
   transmit, via the communication interface to the end device, the second message.

10. The network device of claim 9, wherein the second message includes a registration accept message that includes an information element, wherein the information element includes the end device policy.

11. The network device of claim 9, wherein the processor further executes the instructions to:
    store the end device policy only when the registration procedure is not completed and the policy control procedure is completed.

12. The network device of claim 9, wherein the processor further executes the instructions to:
    transmit, via the communication interface, a registration request to a unified data management device.

13. The network device of claim 9, wherein the end device policy includes at least one of a route selection policy or an access discovery and selection policy.

14. The network device of claim 9, wherein the network device is a mobility management entity device or an access and management function device, and the core network includes an evolved packet core network or a next generation core network.

15. The network device of claim 9, wherein, when determining whether the registration procedure and the policy control procedure are completed, the processor further executes the instructions to:
    determine whether a registration response is received from a unified data management device or a home subscriber server; and
    determine, in response to a determination that the registration response is received, that the registration procedure is completed.

16. The network device of claim 9 wherein, when determining whether the registration procedure and the policy control procedure are completed, the processor further executes the instructions to:
    determine whether a policy control create response is received from a policy control function device or a policy charging and rules function; and
    determine, in response to a determination that the policy control create response is received, that the policy control procedure is completed.

17. A non-transitory computer-readable storage medium storing instructions executable by a processor of a device of a core network, which when executed cause the device to:
    receive, from an end device, a first message that includes an initial registration request and an end device policy request that includes a User Equipment (UE) Policy Section Identifier (UPSI) List Transport message, and wherein the end device is not registered with the device;
    execute, in response to the receipt of the first message, a registration procedure and a policy control procedure;
    determine whether the registration procedure and the policy control procedure are completed;
    generate, when the registration procedure and the policy control procedure are completed, a second message that includes a registration response and an end device policy, wherein the first message is received as a non-access stratum message and the second message is transmitted as another non-access stratum message; and
    transmit, to the end device, the second message.

18. The non-transitory computer-readable storage medium of claim 17,
    wherein the second message includes a registration accept message that includes an information element, wherein the information element includes the end device policy.

19. The non-transitory computer-readable storage medium of claim 17, wherein the instructions further comprise instructions, which when executed cause the device to:
    store the end device policy only when the registration procedure is not completed and the policy control procedure is completed.

20. The non-transitory computer-readable storage medium of claim 17, wherein the device is a mobility management entity device or an access and management function device, and the core network includes an evolved packet core network or a next generation core network.

* * * * *